(12) United States Patent
Glover

(10) Patent No.: US 6,422,586 B1
(45) Date of Patent: Jul. 23, 2002

(54) STROLLER LATCH APPARATUS

(75) Inventor: Richard Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/387,127

(22) Filed: Aug. 31, 1999

(51) Int. Cl.⁷ .............................. B62B 7/06; F16D 3/00
(52) U.S. Cl. ..................... 280/647; 280/642; 280/650; 403/100
(58) Field of Search .................................. 280/647, 642, 280/644, 650, 42, 658, 649; 403/100, 102, 101, 99; 16/324, 321, 326, 353; 297/45

(56) References Cited

U.S. PATENT DOCUMENTS

| | | | | |
|---|---|---|---|---|
| 2,038,143 A | * | 4/1936 | Swanson | 403/102 |
| 2,467,579 A | * | 4/1949 | Boudreau | 403/100 |
| 3,187,373 A | * | 6/1965 | Fisher | 16/324 |
| 4,030,769 A | | 6/1977 | Peng et al. | |
| 4,415,180 A | | 11/1983 | Payne, Jr. | |
| 4,765,645 A | * | 8/1988 | Shamie | 280/644 |
| 5,226,658 A | | 7/1993 | Huang | |
| 5,288,098 A | | 2/1994 | Shamie | |
| 5,669,625 A | * | 9/1997 | Cabagnero | 280/647 |
| 5,845,925 A | * | 12/1998 | Haung | 280/642 |

FOREIGN PATENT DOCUMENTS

| | | | | |
|---|---|---|---|---|
| FR | 2603241 | * | 3/1988 | 280/647 |
| GB | 2074281 | * | 10/1981 | 280/647 |
| GB | 2161759 | * | 1/1986 | 280/647 |
| JP | 1297371 | * | 11/1989 | 280/647 |

* cited by examiner

*Primary Examiner*—Lanna Mai
*Assistant Examiner*—Hau Phan
(74) *Attorney, Agent, or Firm*—Barnes & Thornburg

(57) ABSTRACT

A wheeled stroller comprising
a frame movable between a use position and a storage position, having
a latch member arranged to pivot about an axis of rotation and move axially between a latched position securing the frame in the use position and an unlatched position permitting movement of the frame to the storage position. The latch member including a body portion and a first latch portion and with the with first latch portion coupled to the body portion and being movable between a latched position securing the body portion against axial movement and an unlatched position permitting axial movement of the body portion.

44 Claims, 4 Drawing Sheets

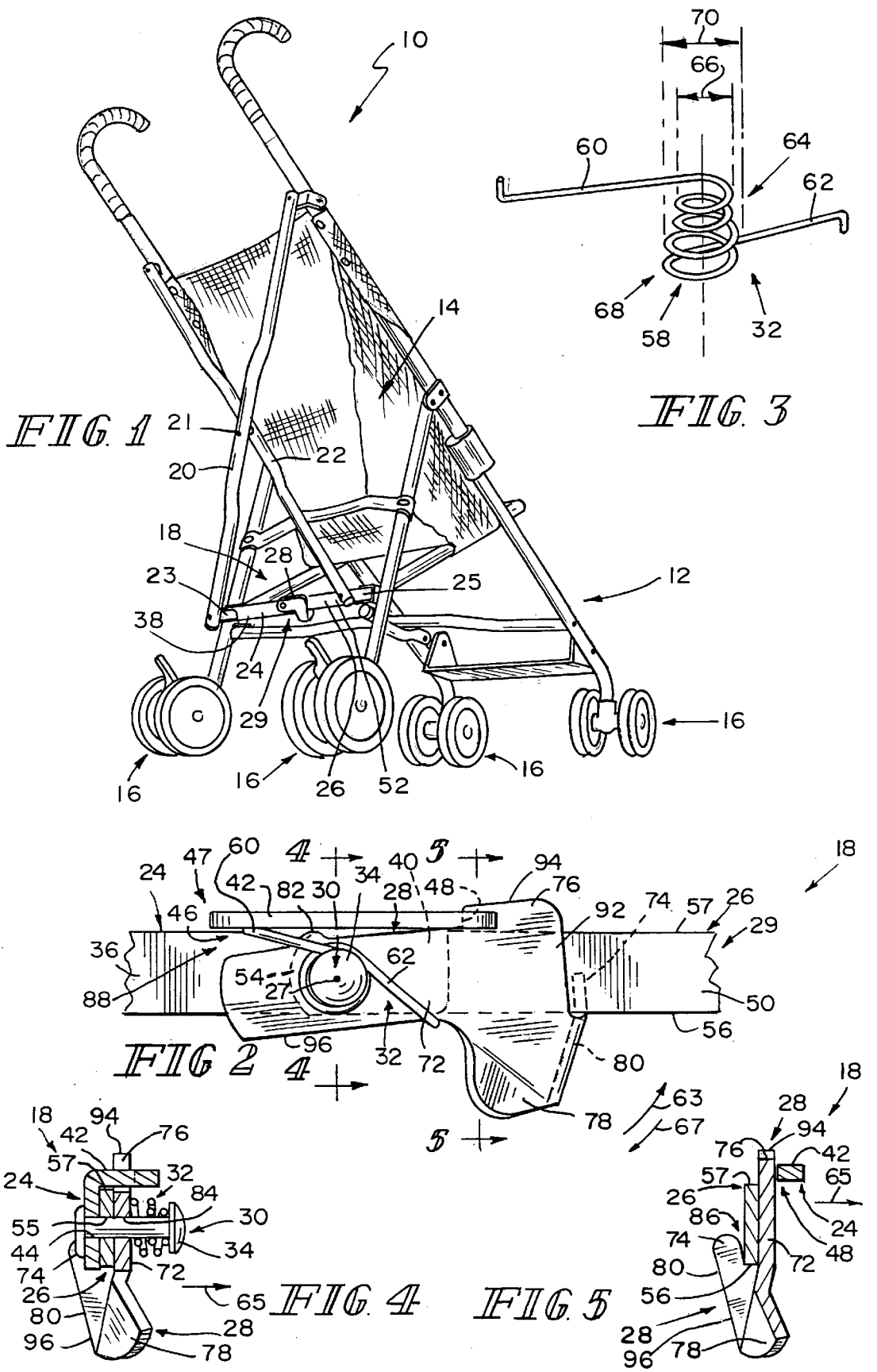

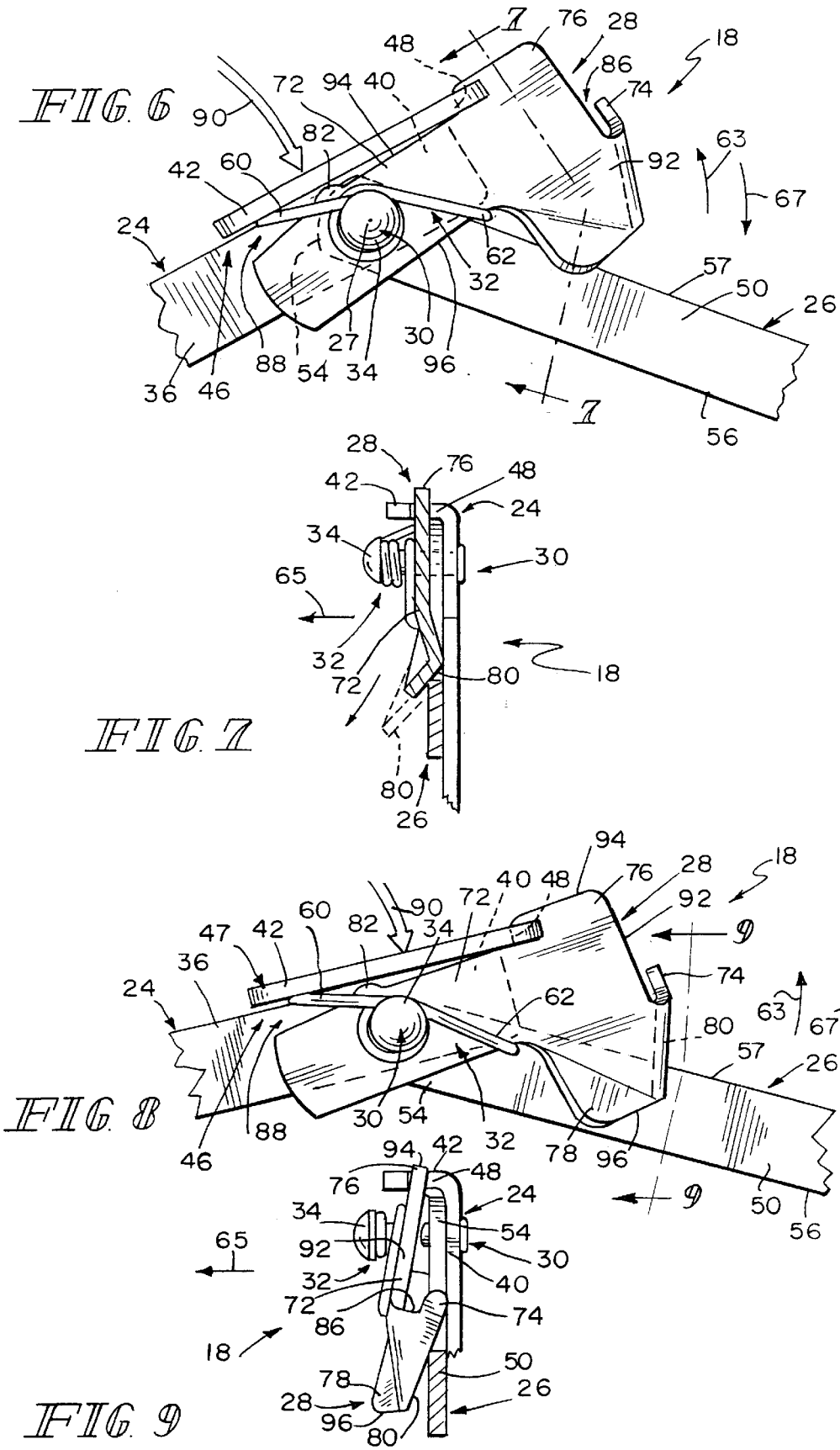

STROLLER LATCH APPARATUS

BACKGROUND AND SUMMARY OF THE INVENTION

The present invention relates to strollers. More particularly, the present invention relates to strollers movable between an open use position and a collapsed storage position and having a latch that secures the stroller in the use position.

Strollers provide parents and other caretakers with a convenient device for transporting babies and toddlers. Some strollers are collapsible from an open use position to a compact storage position to aid in storage and transportation of the stroller when not in use. Many of these strollers have a latch or other device to secure the stroller in the use position during use.

According to the present invention, a stroller is provided including a frame, a plurality of wheels coupled to the frame, and a seat coupled to the frame. The frame includes first and second frame members that are movable relative to each other between first and second frame positions. The stroller further includes a latch apparatus coupled to the first and second frame members to latch the frame members in the first frame position. The latch apparatus includes a first link coupled to the first frame member, a second link coupled to the second frame member, and a latch member positioned to latch the first and second links in a latch position. A fastener is positioned to couple the first link, the second link, and the latch member together. A spring is positioned to rotationally bias the latch member into engagement with the second link.

According to a preferred embodiment of the present invention, the latch member includes a body portion and a latch portion coupled to the body portion. The latch portion is positioned to engage the second link to restrain the body portion from moving axially and rotationally relative to the second link and to restrain the first and second links from moving rotationally relative to each other. Furthermore, the spring is positioned to axially bias the latch member.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a stroller showing the stroller including a frame, a seat, and four wheels coupled to the frame, the frame including a pair of frame members crossing over at a pivot point, and a latch apparatus coupled to lower ends of the frame members;

FIG. 2 is a side elevation view of the latch apparatus, with portions broken away, showing the latch apparatus in a latched position and including a first link, a second link, a latch member, a spring, and a fastener coupling the links, latch member, and spring together;

FIG. 3 is a perspective view of the spring showing the spring including a coil portion, a first arm, and a second arm;

FIG. 4 is a sectional view taken along line 4—4 of FIG. 2 showing the fastener extending through the spring, the latch member, the second link, and the first link;

FIG. 5 is a sectional view taken along line 5—5 of FIG. 2 showing the latch member including a body portion and a first latch portion "hooked" around the second link;

FIG. 6 is a side elevation view of the latch apparatus in a first engagement position showing the first link including an elongated body portion and a plate coupled to the body portion, the latch member further including a cam portion coupled to the body portion of the latch member that engages the second link as a force is applied to the plate of the first link;

FIG. 7 is a cross-sectional view taken along line 7—7 of FIG. 6 showing the latch apparatus in the first engagement position with the cam portion of the latch member engaging the second link to move axially outward against the bias of the spring to a second engagement position (in phantom)(see FIG. 9) with the cam portion pushed downwardly and axially outward;

FIG. 8 is a side elevation view of the latch apparatus in the second engagement position showing the cam portion of the latch member engaging the second link;

FIG. 9 is a cross-sectional view taken along line 9—9 of FIG. 8 showing the latch apparatus in the second engagement position with the cam portion of the latch member engaging the second link;

DETAILED DESCRIPTION OF THE DRAWINGS

Figure 10:
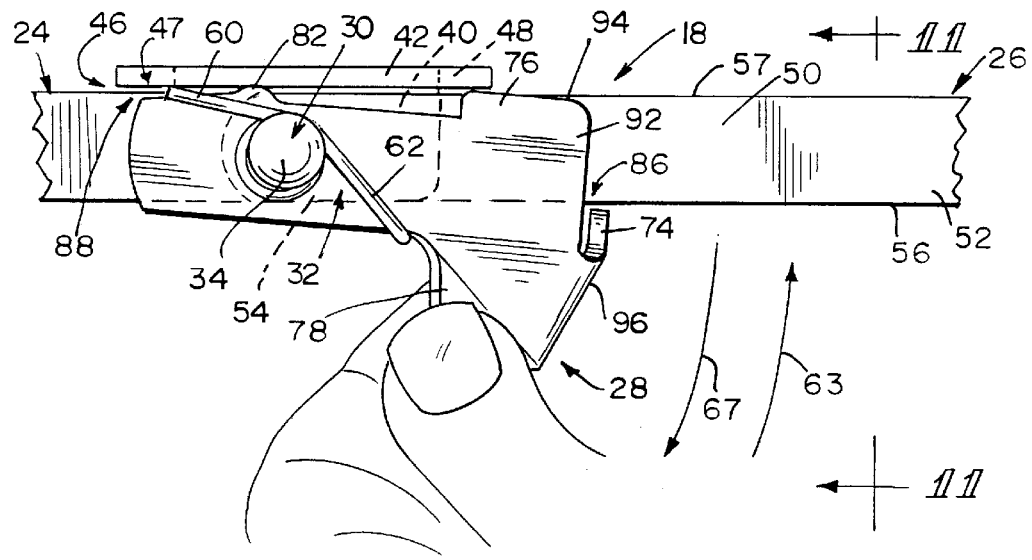
FIG. 10 is a side elevation view of the latch apparatus in a first unlocking position showing a user pulling the latch member down against the rotational bias of the spring to move the first latch portion below the second link.

A stroller 10 according to the present invention is shown in FIG. 1. Stroller 10 is configured to move between an opened use or first frame position, as shown in FIG. 1, and a folded storage or second frame position. Stroller 10 includes a frame 12, a seat 14 coupled to frame 12 and adapted to receive a child therein, a plurality of wheels 16 coupled to frame 12, and a latch apparatus 18 coupled to frame 12 to secure frame 12 in the use position.

As shown in FIG. 1, frame 12 includes a first frame member 20 and a second frame member 22 pivotably coupled to first frame member 20 at a pivot point 21 to form a X-shaped configuration in a first frame position. Latch apparatus 18 includes a first link 24 pivotably coupled to first frame member 20 at a first pivot point 23, a second link 26 pivotably coupled to second frame member 22 at a second pivot point 25 and first link 24 at a third pivot point 27, and a T-shaped latch member 28 pivotably coupled to first and second links 24, 26 at third pivot point 27.

As shown in FIG. 2, latch member 28 latches first link 24 to second link 26 so that first and second links 24, 26 are substantially co-linear and horizontal to provide a rigid bar 29 between first and second frame members 20, 22. Bar 29 prevents first and second frame members 20, 22 from pivoting relative to each other to latch frame 12 in the use position.

As shown in FIG. 4, latch apparatus 18 further includes a fastener 30 extending through first and second links 24, 26 and latch member 28 and a spring 32 positioned between latch member 28 and a head 34 of fastener 30. Fastener 30 provides third pivot point 27 and has an axis of rotation 31 about which first and second links 24, 26 and latch member 28 rotate. Spring 32 is a torsion spring and compression spring that engages first link 24 and latch member 28 to axially and rotationally bias latch member 28 relative to first link 24 and urge latch member 28 to a latched position as shown in FIGS. 2, 4, and 5.

First link 24 is a single element which may be stamped from a flat piece of steel to include a body portion 36, a first end 38 pivotably coupled to first frame member 20 at first pivot point 23, a second end 40 spaced apart from first end 38, a foot plate 42 coupled to body portion 36 near second end 40 and a fastener-receiving aperture 44 sized to receive fastener 30. Foot plate 42 extends substantially perpendicular from body portion 36 and is substantially horizontal when first and second links 24, 26 define rigid bar 29. Body portion 36 and foot plate 42 cooperate to define a junction 47 having a first recess 46 sized to receive spring 32 to provide a spring mount for spring 32. Body portion 36 and foot plate 42 also cooperate to define a second recess 48 sized to receive a portion of latch member 28 as shown in FIG. 5.

Second link 26 includes an elongated body portion 50, a first end 52 pivotably coupled to second frame member 22 at second pivot point 25, a second end 54 spaced apart from first end 52 and pivotably coupled to second end 40 of first link 24 at third pivot point 27, and a fastener-receiving aperture 55 sized to receive fastener 30. Latch member 28 engages a lower edge 56 of second link 26 to secure latch apparatus 18 in the latched position as shown in FIGS. 2 and 5.

As shown in FIG. 3, spring 32 includes a coil portion 58 positioned between head 34 of fastener 30 and latch member 28 (see FIG. 4), a first arm 60 coupled to coil portion 58 and a second arm 62 coupled to coil portion 58. First arm 60 is positioned in first recess 46 of first link 24 (see FIG. 2) so that spring 32 is mounted on first link 24. Similarly, second arm 62 engages latch member 28 to provide support for spring 32 on latch member 28 so that spring 32 rotationally biases latch member 28 toward second end 40 of first link 24 in a counterclockwise direction 63. As shown in FIG. 3, coil portion 58 is conical with a first end 64 having a first diameter 66 and a second end 68 having a second diameter 70 that is greater than first diameter 66.

As shown in FIG. 4, second link member 26 is sandwiched between first link 24 and latch member 28. Coil portion 58 of spring 32 is sandwiched between head 34 of fastener 30 and latch member 28 so that latch member 28, second link 26 and first link 28 are axially compressed together because of the axial bias provided by coil portion 58 of spring 32. First end 64 of coil portion 58 is positioned adjacent to head 34 of fastener 30 and second end 68 of coil portion 58 is positioned adjacent to latch member 28.

As shown in FIG. 2, latch member 28 is a single element which may be stamped from a flat piece of steel to include a body portion 72, a first latch portion 74 (in phantom) coupled to body portion 72, a second latch portion 76 spaced apart from first latch portion 74 and coupled to body portion 72, a downwardly and axially outwardly extending finger grip 78 coupled to body portion 72, a cam portion 80 coupled to body portion 72, an upwardly extending stop portion 82 coupled to body portion 72, and a fastener-receiving aperture 84 formed in body portion 72 to receive fastener 30. First latch portion 74 extends upwardly and is transverse to body portion 72 as shown in FIG. 2. Second latch portion 76 extends upwardly and is substantially coplanar with body portion 72 as shown in FIG. 5. First latch portion 74 and body portion 72 cooperate to define a recess 86 therebetween.

When latch member 28 is in the latched position of FIGS. 2, 4, and 5, lower edge 56 of second link 26 is positioned in recess 86 so that second link 26 is "trapped" by first latch portion 74 against rotational and axial movement relative to latch member 28. Body portion 72 of latch member 28 and foot plate 42 of first link 24 cooperate to define a spring gap 88 in which first arm 60 of spring 32 is positioned as shown in FIG. 2 so that first arm 60 is not pinched between latch member 28 and foot plate 42.

As shown in FIG. 6 when stroller 10 is in the collapsed storage position, first and second links 24, 22 cooperate to form an inverted V-shaped configuration. To latch frame 12 in the use position, a user applies force 90 on foot plate 42 or any other portion of latch apparatus 18 using their foot or hand causing the configuration of first and second links 24, 26 to flatten out as shown in FIG. 2. As first and second links 24, 22 move to the flatten configuration, cam portion 80 of latch member 28 engages an upper edge 57 of second link 26 so that a first end 92 and first latch portion 74 of latch member 28 move in an axial outward direction 65 as shown in FIG. 7 (in phantom).

As continued force 90 is applied to foot plate 42 of first link 24, first end 92 and cam portion 88 of latch member 28 continue to travel down second link 26 until first latch portion 74 is positioned below lower edge 56 of second link 26. Because first latch portion 74 is positioned below lower edge 56 and spring 32 axially biases latch member 28 toward second link 26, first end 92 of latch member 28 is urged axially inward so that first latch portion 74 is positioned axially inwardly of second link 26 as shown for example in FIG. 5. Because spring 32 rotationally biases first end 92 of latch member 28 in counterclockwise direction 63, first latch portion 74 is urged to a position above lower edge 56 of second link 26, as shown in FIG. 2, so that lower edge 56 of second link 26 rest in recess 86.

As shown in FIG. 2, foot plate 42 engages upper edge 57 of second link 26. This engagement prevents further downward movement of first and second links 24, 26 so that first and second links 24, 26 are in a substantially parallel relation forming rigid bar 29 to latch frame 12 in the use position as shown in FIG. 1.

As shown in FIGS. 7 and 9, during the downward movement of first and second links 24, 26, second latch portion 76 of latch member 28 remains positioned in second recess 48 so that body portion 72 is restrained from axial movement by foot plate 42 of first link 24 and second link 26 as shown in FIG. 5. Thus, second latch portion 76 is restrained from movement in an axially outward direction 65. Likewise, because first latch portion 74 is positioned axially inward and above lower edge 56 of second link 26, first latch portion 74 is restrained from moving in axially outward direction 65 so that both upper and lower ends 94, 96 of latch member 28 are prevented from axial movement as shown in FIG. 5.

Latch member 28 is also restrained from pivoting about fastener 30 relative to second link 26 in counterclockwise direction 63 because of the engagement between latch member 28 and lower edge 56. Furthermore, spring 32 biases latch member 28 in counterclockwise direction 63 to resist movement of latch member 28 in clockwise or unlatching direction 67.

While in the latched position as shown in FIGS. 2, 4, and 5, latch member 28 prevents substantial rotation of first link 24 relative to second link 26. Latch member 28 is latched to first link 24 to prevent substantial rotation therebetween and latch member 28 is latched to second link 26 to prevent substantial rotation therebetween. Because both first and second links 24, 26 are latched to latch member 28, first and second links 24, 26 are also latched against rotation therebetween.

While latch member 28 is in the latched position shown in FIGS. 2, 4, and 5, engagement between foot plate 42 of first link 24 and stop portion 82 of latch member 28 restrains clockwise rotation of latch member 28 relative to first link 24 and second latch portion 76 restrains counterclockwise rotation latch member 28 relative to first link 24. Similarly, first latch portion 74 restrains clockwise rotation latch member 28 relative to second link 26.

The engagement between second link 26 and first latch portion 74 and the coupling provided by fastener 30 between second link 26 and latch member 28 prevents clockwise rotation of latch member 28 relative to second link 26 so that latch member 28 is effectively an extension of second link 26. Because latch member 28 provides this effective extension of second link 26, second link 26 is prevented from substantial rotation relative to first link 24 because of engagement between foot plate 42 of first link 24 and latch member 28. Thus, first and second links 24, 26 are restrained from either upward or downward movement relative to each other while latch member 28 is in the latched position. Latch member 28 secures first and second links 24, 26 together to define rigid bar 29 and rigid bar 29 secures first and second frame members 20, 22 in the configuration shown in FIG. 1 to latch frame 12 in the use position.

To enable a user to fold frame 12 to the collapsed storage position, first and second frame members 20, 22 must be released from the latched position by releasing the rigid connection between first and second links 24, 26 that defines rigid bar 29. First and second links 24, 26 are released from the latched position by unlatching latch member 28 from second link 26 which permits first and second links 24, 26 to rotate relative one another and move upwardly toward the inverted V-shape.

Figure 11:
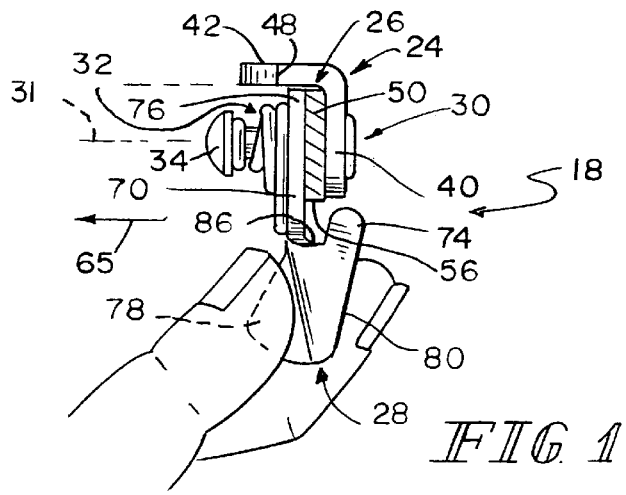
FIG. 11 is a cross-sectional view taken along lines 11—11 of FIG. 10 showing the latch apparatus in the first unlocking position with the first latch portion spaced apart from the second link to provide clearance therebetween.

To unlatch latch member 28 and permit first and second links 24, 26 to move upwardly, a user grips finger grip 78 of latch member 28 and pulls downwardly to rotate latch member 28 in a first rotational direction 67 as shown in FIGS. 10 and 11. Stop portion 82 of latch member 28 engages foot plate 42 to prevent further rotation of latch member 28 in direction 67 to maintain spring gap 88 and prevent pinching of first arm 60 of spring 32.

Figure 12:
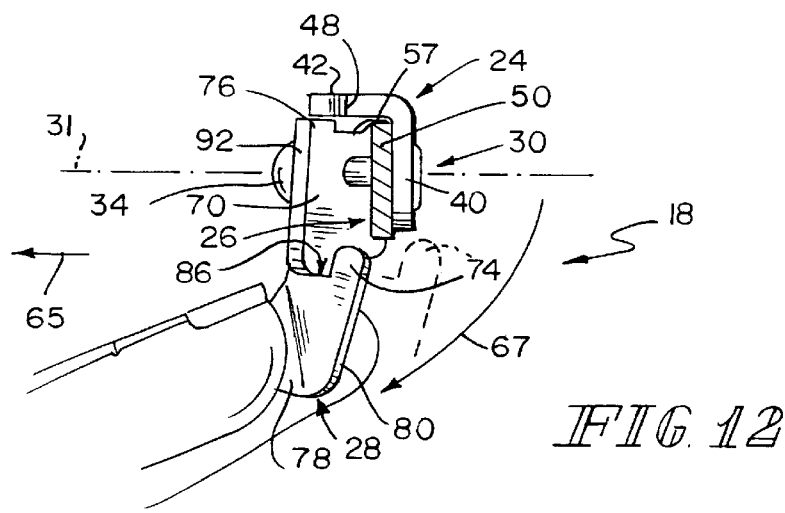
FIG. 12 is a view similar to FIG. 11 showing the latch apparatus moved to a second unlocking position from the first unlocking position (in phantom) with the first latch portion of the latch member pulled axially outward so that the first latch portion is moved from behind the second link to in front of the second link so that the first latch portion may be pushed upwardly without engaging the second link.
Figure 13:
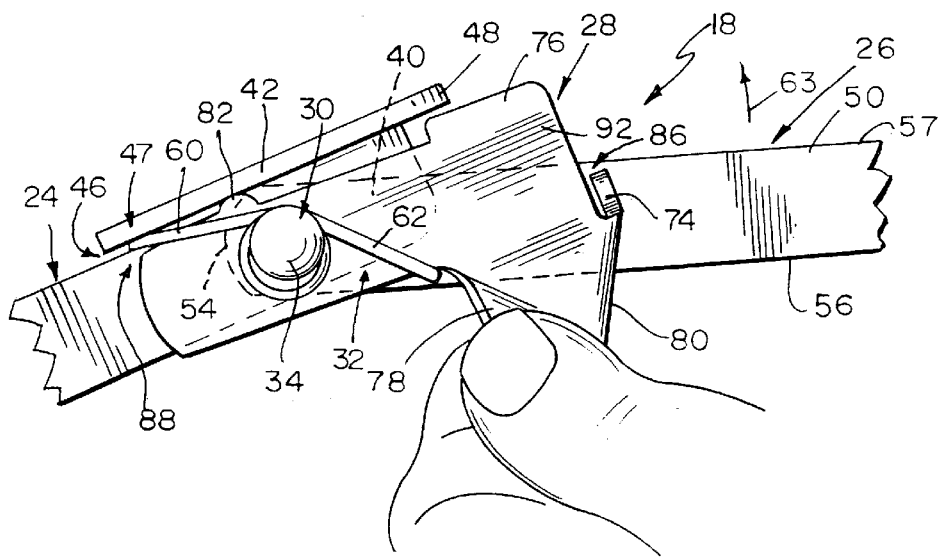
FIG. 13 is a side elevation view of the latch apparatus in a third unlocking position showing a user pulling the latch member outwardly against the axial bias of the spring and rotating the latch member counterclockwise to move the first latch portion upwardly relative to the second link.

The user then pulls axially outwardly in direction 65, as shown in FIG. 12, on finger grip 78 so that latch member 28 pivots about a pivot axis 75 perpendicular to axis of rotation 31 and first latch portion 74 first moves under lower edge 56 of second link 26 to a position axially outward of second link 26. The user next pushes upwardly on finger grip 78 so that first end 92 of latch member 28 moves in a second rotational direction 63 so that second latch portion 76 engages foot plate 42 as shown in FIG. 13. Because first latch portion 74 of latch member 28 is disengaged from second link 26, latch member 28 no longer functions as an extension of second link 26 so that latch member 28 no longer blocks upward movement of second link 26 relative to first link 24. When released by the user, spring 32 urges latch member 28 in counterclockwise direction 63 and axially inwardly so that second latch portion 76 is again positioned in second recess 48 as shown in FIG. 14.

Figure 14:
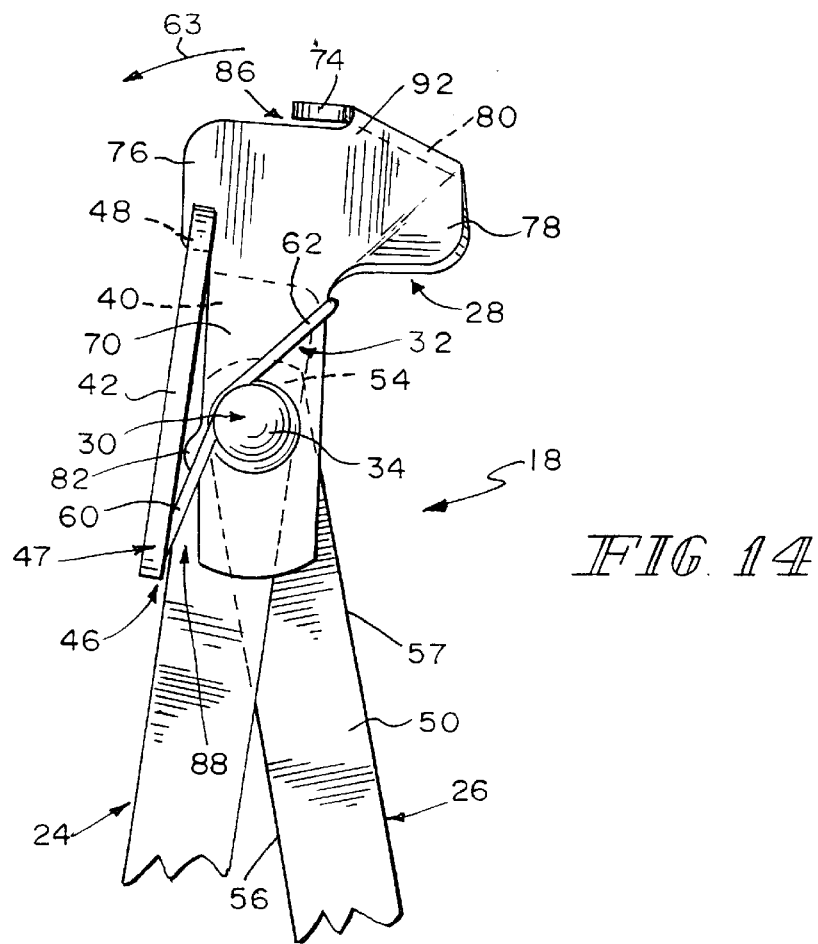
FIG. 14 is a side elevation view of the latch apparatus in a fourth unlocking position showing the latch member disengaged from the second link so that the first and second links form an inverted V-shaped configuration with the frame in a storage or second frame position.

As first and second links 24, 26 are moved upwardly toward the inverted V-shape shown in FIG. 14, the lower ends of first and second frame members 20, 22 move closer together from the first frame position so that frame 12 moves toward the collapsed storage position with the first and second frame members in a second frame position. To move frame 12 back to the use position, the user again applies force 90 on foot plate 42 until first and second plates 24, 26 are latched together to define rigid bar 29.

Although this invention has been described in detail with reference to certain embodiments, variations and modifications exist within the scope and spirit of the invention as described and as defined in the following claims.

What is claimed is:

1. A stroller comprising
   a frame including a first frame member and a second frame member, the first and second frame members being movable relative to each other between first and second frame positions,
   a plurality of wheels coupled to the frame,
   a seat coupled to the frame, and
   a latch apparatus coupled to the first and second frame members to latch the frame members in the first frame position, the latch apparatus including a first link coupled to the first frame member, a second link coupled to the second frame member, a latch member positioned to latch the first and second links in a first link position, a fastener positioned to couple the first link, the second link, and the latch member together and having an axis, and a spring positioned to axially bias the first link, the second link, and the latch member together and rotationally bias the latch member into engagement with the second link, the latch member including a body portion and a first latch portion, the first latch portion coupled to the body portion and positioned to engage the second link to restrain the body portion from moving axially and rotationally relative to the second link and to restrain the first and second links from moving rotationally relative to each other.

2. The stroller of claim 1, wherein the second link is positioned between the first latch portion of the latch member and the body portion to trap the second link therebetween.

3. The stroller of claim 2, wherein the first latch portion extends upwardly from the body portion to define a recess therebetween in which the second link is trapped.

4. The stroller of claim 1, wherein the latch member further includes a second latch portion coupled to the body portion and spaced apart from the first latch member, the first and second latch members restrain the body portion from moving axially relative to the second link.

5. The stroller of claim 4, wherein the second latch portion extends upwardly to engage the first link.

6. The stroller of claim 4, wherein the first link includes a recess and the second latch portion is positioned in the recess.

7. The stroller of claim 6, wherein the first link includes an elongated body portion and a foot plate configured to be stepped on by a user to position the latch member in the latched position, the foot plate and the body portion cooperate to define the recess.

8. The stroller of claim 7, wherein the first link includes an elongated body portion and a foot plate configured to be stepped on by a user to position the latch member in the latched position, the foot plate and the body portion cooperate to define a junction therebetween, and the first arm of the spring is positioned in the junction.

9. The stroller of claim 8, wherein the foot plate and the elongated body portion cooperate to define a recess at the junction and the first arm of the spring is positioned in the junction.

10. The stroller of claim 1, wherein the spring has a first arm engaging the first link and a second arm engaging the latch member.

11. The stroller of claim 8, wherein the first link includes an elongated body portion and a foot plate configured to be stepped on by a user to position the latch member in the latched position, the latch member includes a body portion and a stop portion extending from the body portion and positioned to engage the foot plate of the first link so that the body portion of the latch member and the foot plate cooperate to define a spring gap therebetween, and the first arm of the spring is positioned in the spring gap to prevent pinching of the spring during movement of the frame members to the second frame position.

12. The stroller of claim 10, wherein the spring includes a conical coil portion.

13. The stroller of claim 1, wherein the latch member further includes a cam portion coupled to the body portion and positioned to engage the second link during movement of the frame members between the first and second positions to move the body portion axially outward relative to the second link.

14. A stroller comprising
a frame including a first frame member and a second frame member, the first and second frame members being movable relative to each other between first and second frame positions,
a plurality of wheels coupled to the frame,
a seat coupled to the frame, and
a latch apparatus coupled to the first and second frame members to latch the frame members in the first frame position, the latch apparatus including a first link coupled to the first frame member, a second link coupled to the second frame member, a latch member positioned to latch the first and second links in a first link position, a fastener positioned to couple the first link, the second link, and the latch member together and having an axis, and a spring positioned to rotationally bias the latch member into engagement with the second link.

15. The stroller of claim 14, wherein the spring is positioned to axially bias the latch member into engagement with the second link.

16. The stroller of claim 15, wherein the latch member is configured for movement along the axis of the fastener against the axial bias of the spring.

17. The stroller of claim 14, wherein the spring includes a first arm engaging the first link and a second arm engaging the latch member.

18. The stroller of claim 14, wherein the fastener includes a shank and a head coupled to the shank, and the spring is positioned between the head and the latch member.

19. The stroller of claim 14, wherein the first and second links are substantially horizontal in the first link position.

20. The stroller of claim 14, wherein the first and second links are substantially co-linear.

21. A stroller comprising
a frame movable between an opened use position and a collapsed storage position,
a plurality of wheels coupled to the stroller, and
a latch apparatus coupled to the frame for movement between a latched position securing the frame in the use position and an unlatched position permitting the frame to move to the collapsed position, the latch apparatus including a latch member pivotable about an axis of rotation and movable axially along an axis of rotation for movement between a latched position and an unlatched position and a spring engaging the latch member to axially and rotationally bias the latch member to the latched position.

22. The stroller of claim 21, wherein spring remains rotationally torqued while the latch member is in the latched position.

23. The stroller of claim 21, wherein the spring remains axially compressed while the latch member is in the latched position.

24. The stroller of claim 21, wherein the latch member is configured to move along the axis of rotation and the axial bias of the spring urges the latch member against movement along the axis of rotation.

25. The stroller of claim 21, wherein the latch apparatus further includes a first link pivotably coupled to the frame, a second link pivotably coupled to the frame and the first link, and a fastener pivotably coupling the latch member to the first link, the spring engages the latch member and the first link to rotationally bias the latch member relative to the first link.

26. The stroller of claim 25, wherein the second link is positioned between the first link and the latch member and the latch member is positioned between the spring and the second link so that the latch member is axially biased toward the first and second links.

27. The stroller of claim 25, wherein the fastener couples the first links, the second link, and the latch member together to rotate about the axis of rotation.

28. A stroller comprising
a frame including a first frame member and a second frame member, the first and second frame members being movable relative to each other between first and second frame positions,
a plurality of wheels coupled to the frame,
a seat coupled to the frame, and
a latch apparatus coupled to the first and second frame members to latch the frame members in the first frame position, the latch apparatus including a first link coupled to the first frame member, a second link coupled to the second frame member, a latch member positioned to latch the first and second links in a first link position, and a fastener positioned to couple the latch member first link and the second link together and having an axis, the latch member including a body portion and a first latch portion coupled to the body portion and positioned to engage the second link to restrain the latch member from moving axially along the axis of the fastener relative to the second link from a latched position.

29. The stroller of claim 28, wherein the first latch portion and the body portion cooperate to define a recess therebetween and the second link is positioned in the recess.

30. The stroller of claim 29, wherein the second link includes a lower edge and the first latch portion extends upwardly to a position above the lower edge of the second link to form the recess.

31. The stroller of claim 28, wherein the latch member includes a second latch portion coupled to the body portion and spaced apart from the first latch portion, the second latch portion engages the first link to trap the body portion of the latch member between the first and second links.

32. The stroller of claim 31, wherein the first link includes an elongated body portion and a transverse plate coupled to the elongated body portion, the elongated body and the plate cooperate to define a recess therebetween, and the second latch portion of the latch member is positioned in the recess to restrain movement of the body portion of the latch relative to the first link.

33. The stroller of claim 28, wherein the first latch portion is substantially perpendicular to the body portion.

34. A stroller comprising
 a frame movable between a use position and a storage position,
 a plurality of wheels coupled to the frame, and
 a latch member arranged to pivot about an axially of rotation and move axial between a latched position securing the frame in the use position and an unlatched position permitting movement of the frame to the storage position, the latch member including a body portion and a first latch portion the first latch portion coupled to the body portion and being movable between a latched position securing the body portion against axial movement and an unlatched position permitting axial movement of the body portion.

35. The stroller of claim 34, further comprising a means for rotationally biasing the latch member.

36. The stroller of claim 35, further comprising a means for axially biasing the latch member.

37. The stroller of claim 35, wherein the latch member includes means for camming the first latch portion axially outward.

38. The stroller of claim 34, further comprising a means for axially biasing the latch member.

39. A stroller comprising
 a frame including a first frame member and a second frame member, the first and second frame members being movable relative to each other between first and second frame positions,
 a plurality of wheels coupled to the frame,
 a seat coupled to the frame, and
 a latch apparatus coupled to the first and second frame members to latch the frame members in the first frame position, the latch apparatus including a first link coupled to the first frame member, a second link coupled to the second frame member, a fastener coupling the second link to the first link and having an axis, a latch member coupled to the first and second links for axial movement between a latched position securing the first and second links in a first link position and unlatched position permitting movement of the first and second links from the latched position, and means for latching the latch member to the second link to restrain axial movement thereof from the latched position.

40. A method for locking and unlocking a stroller frame in a use position, the stroller comprising a latch apparatus including a first link coupled to the stroller frame, a second link coupled to the stroller frame, a latch member positioned to latch the first link relative to the second link, and a fastener positioned to couple the first link to the second link and having an axis, the method comprising the steps of
 locking the stroller frame in the use position with the latch apparatus and
 unlocking the stroller frame from the use position by moving the latch member relative to the second link in a first rotational direction, moving the latch member relative to the second link in an axial direction, and moving the latch member relative to the second link in a second rotational direction opposite the first rotational direction.

41. The method of claim 40, wherein the locking step includes the step of axially biasing the latch member.

42. The method of claim 41, wherein the locking step further includes the step of rotationally biasing the latch member.

43. The method of claim 40, wherein the locking step includes the step of camming the latch member against the second link to axially move the latch member relative to the second link.

44. The method of claim 40, wherein the unlocking step further includes the step of moving the latch member into engagement with the first link to rotate the first link about the axis.

\* \* \* \* \*